United States Patent
Kwon et al.

(10) Patent No.: US 12,147,892 B2
(45) Date of Patent: Nov. 19, 2024

(54) ELECTRONIC APPARATUS AND CONTROLLING METHOD THEREOF

(71) Applicant: SAMSUNG ELECTRONICS CO., LTD., Suwon-si (KR)

(72) Inventors: Sejung Kwon, Suwon-si (KR); Baeseong Park, Suwon-si (KR); Dongsoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 819 days.

(21) Appl. No.: 16/843,365

(22) Filed: Apr. 8, 2020

(65) Prior Publication Data

US 2020/0364558 A1 Nov. 19, 2020

(30) Foreign Application Priority Data

May 16, 2019 (KR) .................. 10-2019-0057261

(51) Int. Cl.
*G06N 3/08* (2023.01)
*G06N 3/04* (2023.01)

(52) U.S. Cl.
CPC ................ *G06N 3/08* (2013.01); *G06N 3/04* (2013.01)

(58) Field of Classification Search
CPC ................................... G06N 3/08; G06N 3/04
See application file for complete search history.

(56) References Cited

U.S. PATENT DOCUMENTS

| | | |
|---|---|---|
| 10,223,635 B2 | 3/2019 | Annapureddy et al. |
| 10,878,319 B2 | 12/2020 | Alsharif et al. |
| 11,948,062 B2 | 4/2024 | Alsharif et al. |

(Continued)

FOREIGN PATENT DOCUMENTS

| | | |
|---|---|---|
| CN | 102081690 A | 6/2011 |
| JP | 2017-142629 A | 8/2017 |

(Continued)

OTHER PUBLICATIONS

Osawa, K., Sekiya, A., Naganuma, H., & Yokota, R. (Jul. 2017). Accelerating matrix multiplication in deep learning by using low-rank approximation. In 2017 International Conference on High Performance Computing & Simulation (HPCS) (pp. 186-192). IEEE. (Year: 2017).*

(Continued)

*Primary Examiner* — Kamran Afshar
*Assistant Examiner* — Lokesha G Patel
(74) *Attorney, Agent, or Firm* — Sughrue Mion, PLLC

(57) ABSTRACT

Provided is an electronic apparatus. The electronic apparatus includes a memory and a processor. The processor is configured to apply a low rank approximation using a matrix decomposition for a first square matrix among a plurality of square matrices based on parameter values of a deep learning model, and obtain a first approximated matrix and a second approximated matrix for the first square matrix, obtain second approximated matrices for each of a plurality of remaining square matrices other than the first square matrix among the plurality of square matrices, based on the first approximated matrix for the first square matrix, and store the first approximated matrix the first square matrix and the second approximated matrices for each of the plurality of square matrices in the memory.

14 Claims, 10 Drawing Sheets

(56) References Cited

U.S. PATENT DOCUMENTS

| | | |
|---|---|---|
| 2005/0033708 A1 | 2/2005 | Achlioptas et al. |
| 2014/0156575 A1 | 6/2014 | Sainath et al. |
| 2016/0055124 A1 | 2/2016 | Galvin et al. |
| 2016/0162782 A1 | 6/2016 | Park |
| 2016/0217369 A1 | 7/2016 | Annapureddy et al. |
| 2017/0220925 A1 | 8/2017 | Alsharif et al. |
| 2018/0046915 A1 | 2/2018 | Sun et al. |
| 2019/0042926 A1 | 2/2019 | Baghsorkhi et al. |
| 2021/0089916 A1 | 3/2021 | Alsharif et al. |

FOREIGN PATENT DOCUMENTS

| | | |
|---|---|---|
| KR | 10-0603639 B1 | 7/2006 |
| KR | 10-2017-0106338 A | 9/2017 |
| KR | 10-2018-0084988 A | 7/2018 |
| WO | 2015089148 A2 | 6/2015 |
| WO | 2016029163 A1 | 2/2016 |

OTHER PUBLICATIONS

Low rank matrix approximation using truncated SVD. Expert consulting in applied mathematics & data privacy. (n.d.). Retrieved Dec. 1, 2022 from https://www.johndcook.com/blog/2018/05/07/truncated-svd/. (Year: 2018).*

Han, S., Mao, H., & Dally, W. J. (2015). Deep compression: Compressing deep neural networks with pruning, trained quantization and huffman coding. arXiv preprint arXiv:1510.00149. (Year: 2015).*

Liu, Z., Sun, M., Zhou, T., Huang, G., & Darrell, T. (2019). Rethinking the value of network pruning. arXiv preprint arXiv:1810.05270. (Year: 2019).*

Zhu, J., Qian, Z., & Tsui, C. Y. (Jan. 2016). Lradnn: High-throughput and energy-efficient deep neural network accelerator using low rank approximation. In 2016 21st Asia and South Pacific Design Automation Conference (ASP-DAC) (pp. 581-586). IEEE. (Year: 2016).*

Written Opinion (PCT/ISA/237) issued by the International Searching Authority in corresponding International Application No. PCT/KR2020/004774, on Jul. 7, 2020.

International Search Report (PCT/ISA/210), issued by International Searching Authority in corresponding International Application No. PCT/KR2020/004774, on Jul. 7, 2020.

Communication dated May 14, 2024, issued by the Korean Patent Office in Korean Application No. 10-2019-0057261.

* cited by examiner

ELECTRONIC APPARATUS AND CONTROLLING METHOD THEREOF

CROSS-REFERENCE TO RELATED APPLICATION(S)

This application is based on and claims priority under 35 U.S.C. § 119 to Korean Patent Application No. 10-2019-0057261, filed on May 16, 2019, in the Korean Intellectual Property Office, the disclosure of which is incorporated by reference herein in its entirety.

BACKGROUND

1. Field

The disclosure relates to an electronic apparatus and a controlling thereof and, more particularly, to an electronic apparatus for compressing a deep learning model and executing the compressed deep learning model, and a controlling method thereof.

2. Description of Related Art

Recently, a technique for compressing a deep learning model of an artificial intelligence (AI) without degrading the performance of the AI has been spotlighted. Because AI collects endless information from various sources and operates based on those collected information, it requires a large amount of space in a memory. Therefore, there is a need for applying compression technique to the deep learning model without degrading AI's performance, and the compression provides a way for the lower cost and faster deep learning model. Thus, a deep learning model may be implemented in devices having small resources, such as a mobile device.

Accordingly, an efficient compression of a deep learning model may decrease the size of a required space in a memory and decrease response time of the deep learning model. In related-arts, there is a problem that the required memory size is too large or the response time is too slow so the deep learning model cannot be practically used in a device having a small resource such as a mobile device.

In the related-art, the deep learning model uses low rank approximation (LRA) utilizing a singular value decomposition (SVD) for compression.

The compression method using the conventional singular value decomposition may be advantageous when the calculation is relatively simple, but the compression ratio is relatively low compared to other methods, such as pruning and quantization.

The singular value decomposition typically shows a better compression rate when represented in a square matrix. Therefore, if the deep learning model to be compressed is a fully-connected layer, there is no critical problem. However, for example, if it is a four-dimensional tensor made up of height, width, a number of input channels, and a number of output channels, there is a high possibility that a rectangular matrix having a long side is generated when simply transformed in a two-dimensional manner and thus, the compression ratio and accuracy of the deep learning model may be reduced.

SUMMARY

Provided is an electronic apparatus capable of improving a compression ratio of a deep learning model without degrading the performance of the deep learning model by applying a low rank approximation through matrix decomposition, and a method for controlling thereof.

Provided is an electronic apparatus capable of efficiently utilizing the compressed deep learning model and a method for controlling thereof.

According to an embodiment, there is provided an electronic apparatus including a memory and a processor. The processor is configured to apply a low rank approximation using a matrix decomposition for a first square matrix among a plurality of square matrices based on parameter values of a deep learning model, and obtain a first approximated matrix and a second approximated matrix for the first square matrix, obtain second approximated matrices for each of a plurality of remaining square matrices other than the first square matrix among the plurality of square matrices, based on the first approximated matrix for the first square matrix, and store the first approximated matrix for the first square matrix and the second approximated matrices for each of the plurality of square matrices in the memory.

The matrix decomposition includes a singular value decomposition (SVD).

The processor is further configured to obtain a first matrix and a second matrix by applying the singular value decomposition to the first square matrix, and obtain the first approximated matrix and the second approximated matrix for the first square matrix by applying the low rank approximation to the first matrix and the second matrix.

The first approximated matrix for the first square matrix is a right-singular value vector matrix approximated for the first square matrix, and the second approximated matrices for each of the plurality of square matrices are left-singular value vector matrices approximated for each of the plurality of square matrices.

The processor is further configured to obtain the second approximated matrices for each of the plurality of remaining square matrices by multiplying each of the plurality of remaining square matrices by an inverse matrix of a transposed first matrix to which the first matrix is transposed.

The processor is further configured to obtain a second approximated matrix for a second square matrix through an algorithm to minimize a difference between the second square matrix and a product of the second approximated matrix for the second square matrix and the first approximated matrix for the first square matrix, and the second square matrix is any one of the plurality of remaining square matrices.

According to another embodiment, there is provided an electronic apparatus including a memory storing a first approximated matrix and second approximated matrices forming a compressed deep learning model and a processor configured to load the compressed deep learning model stored in the memory and obtain an output value based on the compressed deep learning model. The first approximated matrix is one of two matrices obtained by applying a low rank approximation using a matrix decomposition for a first square matrix among a plurality of square matrices based on parameter values of a deep learning model, and the second approximated matrices comprise another approximated matrix other than the first approximated matrix among the two matrices and approximated matrices obtained based on the first approximated matrix and a plurality of remaining square matrices other than the first square matrix among the plurality of square matrices.

The first approximated matrix is a right-singular value vector matrix obtained by applying the low rank approximation through singular value decomposition (SVD) to the first square matrix, and the second approximated matrices are left-singular value vector matrices for each of the plurality of square matrices.

The processor further includes a calculator, a primary cache memory, and a second cache memory. The first approximated matrix is loaded into the primary cache memory from the memory, and at least one second approximated matrix among the second approximated matrices is loaded into the secondary cache memory from the memory, and the calculator is configured to obtain the output value based on the approximated matrices loaded into the primary cache memory and the secondary cache memory.

While the calculator is performing a first algorithm based on an input value and the first approximated matrix loaded into the primary cache memory, the at least one second approximated matrix is loaded into the secondary cache memory from the memory, and the calculator is configured to perform a second algorithm based on a first algorithm result and the at least one second approximated matrix loaded into the secondary cache memory.

According to another embodiment, there is provided a method for controlling an electronic apparatus, the method including applying a low rank approximation using a matrix decomposition for a first square matrix among a plurality of square matrices based on parameter values of a deep learning model, and obtaining a first approximated matrix and a second approximated matrix for the first square matrix; obtaining second approximated matrices for each of a plurality of remaining square matrices other than the first square matrix among the plurality of square matrices based on the first approximated matrix for the first square matrix; and storing the first approximated matrix for the first square matrix and the second approximated matrices for each of the plurality of square matrices in the memory.

The matrix decomposition comprises a singular value decomposition (SVD).

The obtaining the first approximated matrix and the second approximated matrix for the first square matrix includes obtaining a first matrix and a second matrix by applying the singular value decomposition to the first matrix, and obtaining the first approximated matrix and the second approximated matrix for the first square matrix by applying the low rank approximation to the first matrix and the second matrix.

The first approximated matrix for the first square matrix is a right-singular value vector matrix approximated for the for the first square matrix, and the second approximated matrices for each of the plurality of square matrices are left-singular value vector matrices approximated for each of the plurality of square matrices.

The obtaining the second approximated matrices for each of the plurality of remaining square matrices includes obtaining the second approximated matrices for each of the plurality of remaining square matrices by multiplying each of the plurality of remaining square matrices by an inverse matrix of a transposed first matrix to which the first matrix is transposed.

The obtaining the approximated second matrices for each of the plurality of remaining square matrices includes obtaining a second approximated matrix for a second square matrix through an algorithm to minimize a difference between the second square matrix and a product of the second approximated matrix for the second square matrix and the first approximated matrix for the first square matrix. The second square matrix is any one of the plurality of remaining square matrices.

According to another embodiment, there is provided a method for controlling an electronic apparatus, the method including loading a compressed deep learning model stored in a memory; and obtaining an output value based on the compressed deep learning model. The compressed deep learning model includes a first approximated matrix and second approximated matrices, where the first approximated matrix is one of two matrices obtained by applying a low rank approximation using a matrix decomposition for a first square matrix among a plurality of square matrices based on parameter values of a deep learning model, and where the second approximated matrices comprise another approximated matrix other than the first approximated matrix among the two matrices and approximated matrices obtained based on the first approximated matrix and a plurality of remaining square matrices other than the first square matrix among the plurality of square matrices.

The first approximated matrix is a right-singular value vector matrix obtained by applying the low rank approximation through singular value decomposition (SVD) to the first square matrix, and the second approximated matrices are left-singular value vector matrices for each of the plurality of square matrices.

The loading further includes loading the first approximated matrix into a primary cache memory from the memory; and loading at least one second approximated matrix among the second approximated matrices into a secondary cache memory from the memory, where the obtaining the output value comprises obtaining the output value based on the approximated matrices loaded into the primary cache memory and the secondary cache memory.

The loading further includes, while performing a first algorithm based on an input value and the first approximated matrix loaded into the primary cache memory, loading the at least one second approximated matrix into the secondary cache memory, and the obtaining the output value further comprises performing a second algorithm based on a first algorithm result and the at least one second approximated matrix loaded into the secondary cache memory.

According to various embodiments as described above, a compression ratio of a deep learning model may be improved without degrading the performance. In addition, when running a deep learning model utilizing the compressed deep learning model, power consumption may be reduced and delay in response time may be reduced.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
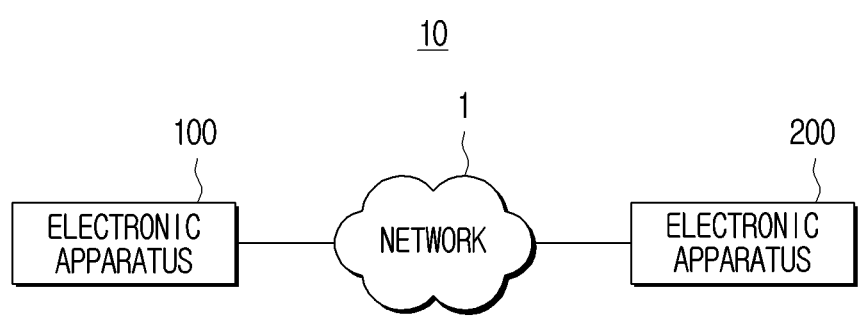
FIG. 1 is a diagram illustrating a deep learning system according to an embodiment.

Hereinafter, embodiments of the disclosure will be described with reference to the accompanying drawings. However, it may be understood that the disclosure is not limited to the embodiments described hereinafter, but include various modifications, equivalents, and alternatives of the embodiments of the disclosure. For the description of the drawings, similar reference numerals may be used for similar constituent elements.

In the disclosure, the term "has," "may have," "includes" or "may include" indicates existence of a corresponding feature (e.g., a numerical value, a function, an operation, or a constituent element such as a component), but does not exclude existence of an additional feature.

In the disclosure, the term "A or B," "at least one of A or/and B," or "one or more of A or/and B" may include all possible combinations of the items that are enumerated together. For example, the term "A or B", "at least one of A and B", or "at least one of A or B" may designate (1) at least one A, (2) at least one B, or (3) both at least one A and at least one B.

In the disclosure, the terms "first, second, etc." may be used to describe various elements regardless of their order and/or importance and to discriminate one element from other elements, but are not limited to the corresponding elements.

If it is described that an element (e.g., first element) is "operatively or communicatively coupled with/to" or is "connected to" another element (e.g., second element), it may be understood that the element may be connected to the other element directly or through still another element (e.g., third element). When it is mentioned that one element (e.g., first element) is "directly coupled" with or "directly connected to" another element (e.g., second element), it may be understood that there is no element (e.g., third element) present between the element and the other element.

Herein, the expression "configured to" may be used interchangeably with, for example, "suitable for", "having the capacity to", "designed to", "adapted to", "made to", or "capable of". The expression "configured to" does not necessarily mean "specifically designed to" in a hardware sense. Instead, under some circumstances, "a device configured to" may indicate that such a device may perform an operation along with another device or part. For example, the expression "a processor configured to perform A, B, and C" may indicate an exclusive processor (e.g., an embedded processor) to perform the corresponding operation, or a generic-purpose processor (e.g., a central processor (CPU) or application processor (AP)) that may perform the corresponding operations by executing one or more software programs stored in the memory device.

FIG. 1 illustrates a deep learning model system 10 according to an embodiment. According to FIG. 1, the deep learning model system 10 may include an electronic apparatus 100 and an electronic apparatus 200 connected via a network 1.

The network 1 may include wide area network (WAN), metropolitan area network (MAN), value area network (VAN), integrated services digital network (ISDN), local area network (LAN), asymmetric digital subscriber line (ADSL), cable TV network, personal area network (PAN), or the like, and the electronic apparatus 100 and the electronic apparatus 200 may communicate with each other through the network 1 using various communication methods such as Institute of Electrical and Electronics Engineers (IEEE), $3^{rd}$ generation (3G), $3^{rd}$ generation partnership project (3GPP), long term evolution (LTE), $5^{th}$ generation mobile communication (5G), Wi-Fi, Bluetooth, near field communication (NFC), Zigbee, or the like, but is not limited thereto.

Although FIG. 1 shows that the electronic apparatus 100 and the electronic apparatus 200 are connected via the network 1, the electronic apparatus 100 and the electronic apparatus 200 may be directly connected through device to device (D2D) communication.

According to an embodiment, the electronic apparatus 100 may compress and store a deep learning model. The electronic apparatus 200 may obtain and execute the deep learning model compressed by the electronic apparatus 100. Here, there is no limitation in a type of the deep learning model.

The electronic apparatus 100 may be a server for generating a compressed deep learning model and the electronic apparatus 200 may be various terminal devices such as a personal computer (PC), a mobile phone, a tablet, a smart television (TV), or the like, for executing the compressed deep learning model, but the embodiment is not limited thereto. For example, the electronic apparatus 200 may compress and store the deep learning model and the electronic apparatus 100 may execute the compressed deep learning model.

For the convenience, the disclosure will describe the electronic apparatus 100 as a server for compressing the deep learning model, and the electronic apparatus 200 as various terminal devices utilizing the compressed deep learning model hereinafter.

Figure 2:
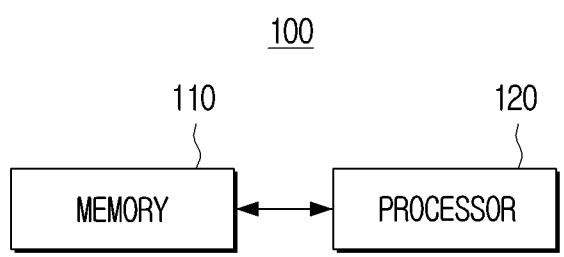
FIG. 2 is a block diagram illustrating an electronic apparatus according to an embodiment.

FIG. 2 is a block diagram illustrating the electronic apparatus 100 according to an embodiment. As illustrated in FIG. 2, the electronic apparatus 100 includes a memory 110 and a processor 120.

The memory 110 may store various data. The memory 110 may store a deep learning model and may store the deep learning model compressed by the processor 120.

The memory 110 may include any one or more of a volatile memory or a non-volatile memory. The volatile memory may include dynamic random access memory (DRAM), static RAM (SRAN), synchronous DRAM (SDRAM), phase-change RAM (PRAM), magnetic RAM (MRAM), resistive RAM (RRAM), ferroelectric RAM (Fe-RAM), or the like. The non-volatile memory may include read only memory (ROM), programmable ROM (PROM), electrically programmable ROM (EPROM), electrically erasable programmable ROM (EEPROM), flash memory, or the like. The memory 110 may include non-volatile medium such as hard disk drive (HDD), solid state disk (SDD), embedded multi-media card (eMMC), universal flash storage (UFS), or the like.

The processor 120 may control an overall operation of the electronic apparatus 100. The processor 120 may compress the deep learning model, and store the compressed deep learning model in the memory 110.

The deep learning model may include a plurality of layers. Each layer may have a plurality of parameter values or weight values. The plurality of parameter values or weight values may be represented by a matrix. The processor 120 may manipulate the matrix based on the parameter values of the deep learning model and compress the deep learning model.

Herein below, various embodiments of compressing the deep learning model by the processor 120 will be described with reference to FIGS. 3, 4 and 5.

Figure 3:
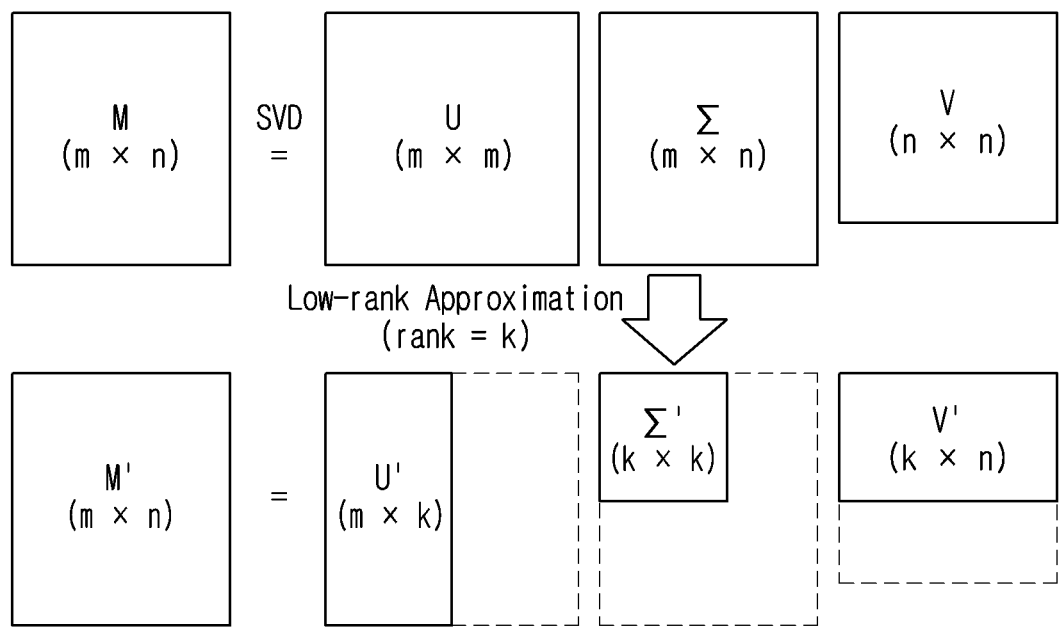
FIG. 3 is a view illustrating a singular value decomposition.

FIG. 3 is a view illustrating a method of compressing the deep learning model through a singular value decomposition.

The singular value decomposition (SVD) is a method for extracting an eigenvalue from a matrix of a real number and decomposing the matrix into a left-singular vectors U, an eigenvalue matrix $\Sigma$, and right-singular vectors V.

Referring to an upper portion of FIG. 3, a matrix M having a size of m×n may be decomposed into a left-singular vector matrix U of an m×m size, an eigenvalue matrix $\Sigma$ in a size of m×n size, and a right-singular vector matrix V having a size of n×n through the singular value decomposition.

A low rank approximation (LRA) through the singular value decomposition is an approximation method using a feature of the eigenvalue matrix $\Sigma$ that is aligned by importance.

Referring to a lower portion of FIG. 3, the low rank approximation, in which the rank is k (where, k is less than m or n), reduces the left-singular vector matrix U of a m×m into a matrix U' of a m×k size, reduces the eigenvalue matrix $\Sigma$ of a m×n size into a matrix $\Sigma$' of a k×k size, and reduces the right-singular vector matrix V of a n×n size into a matrix V' of a k×n size.

As a result, the matrix M of the m×n size is approximated to M' and represented by a product of the smaller matrix (U'*$\Sigma$'*V', hereinafter, U'*$\Sigma$' is considered one matrix and is represented as U'). That is, the matrix M may be approximated to U'*V'. Accordingly, the amount of data of the deep learning model stored in the memory may be significantly reduced. Thus, the low rank approximation is generally used in the related-art of singular value decomposition in deep learning and requires large servers as well as a large memory space in on-device artificial intelligence (AI).

Further, according to this method, since one matrix M' is represented by a smaller matrix product U' *V', a deep learning algorithm in the form of y (output)=M' *x(input) is decomposed into the form y=U' *V'*x. In this case, by multiplying U' after V'*x calculation, there is an effect that the amount of algorithm is reduced and the performance of the deep learning is improved, rather than by multiplying M' directly with x.

However, as described above, the singular value decomposition of the related-art has a low compression ratio compared to a pruning or quantization method, and if the matrix is not a square matrix, the compression ratio or accuracy of the deep learning model is reduced.

Figure 4:
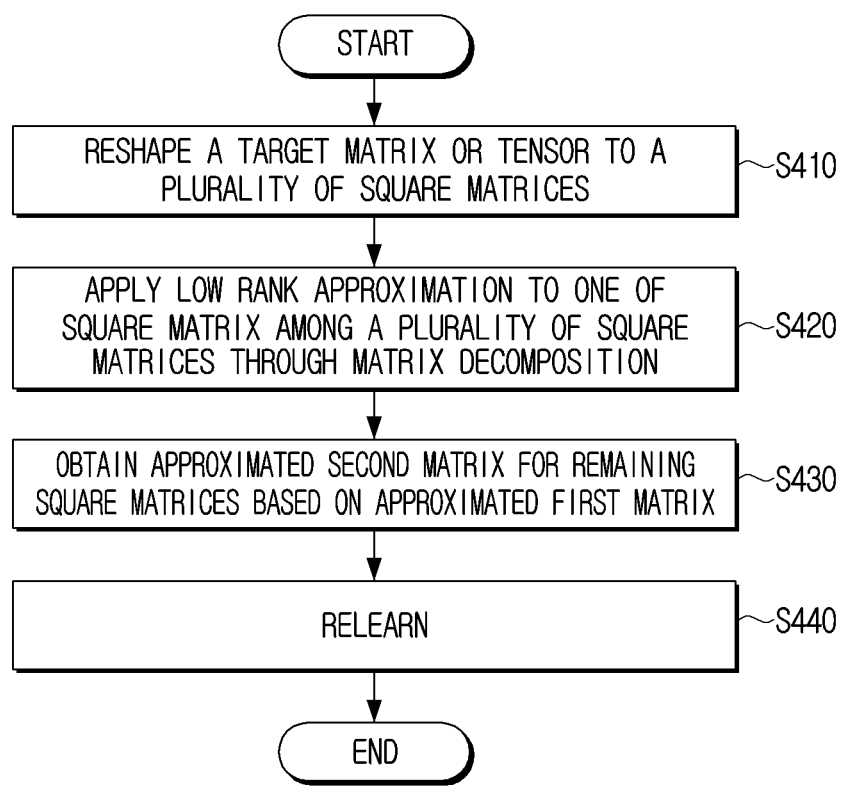
FIG. 4 is a flowchart illustrating a method for compressing a deep learning model by an electronic apparatus according to an embodiment.

FIG. 4 is a flowchart illustrating a method for compressing a deep learning model by the electronic apparatus 100 according to an embodiment.

Referring to FIG. 4, the processor 120 may first reshape (or tile) at least one tensor or matrix to be compressed to i number of small m×m square matrix $M_1 ..._i$ in operation S410. In FIG. 5, $M_1$ to $M_i$ illustrate reshaped i square matrices.

As described above, the deep learning model may include a plurality of layers, and parameter values (or weight values) of each layer may be represented as a tensor or a matrix. Therefore, a tensor or a matrix composed of parameter values of the deep learning model may be a subject of the compression described above.

In various embodiments, there is no limitation as to how a tensor or matrix is decomposed into a square matrix. That is, for example, if the deep learning model consists of L layers, the parameter values that form each layer can be represented as L matrix, and L matrix may be reshaped in a variety of ways to obtain i square matrices, such as $M_1$ to $M_i$. Here, L and i may or may not be the same number.

However, there is no limit as to the method of transforming a tensor to a two-dimensional matrix. According to various embodiments, tensors or matrices of various dimensions and sizes may be decomposed or transformed into a form capable of matrix decomposition or matrix factorization (in particular, singular value decomposition) and thus, the low rank approximation may proceed to a higher rank, thereby allowing more efficient compression.

The processor 120 may obtain the approximated first matrix or second matrix for the any one of square matrix by applying the low rank approximation through the matrix decomposition for any one of square matrix among the plurality of reshaped square matrices in operation S420.

A matrix decomposition (or matrix factorization) generates a matrix as a result of a product of two or more different matrices having a particular structure. In particular, according to one embodiment, the processor 120 may represent one square matrix (e.g., $M_j$) as a product of the two matrices (e.g., $U_j*V_j$) via a matrix decomposition. Here, the two matrices (e.g., $U_j$ and $V_j$) become the first and second matrices (as described below, if $U_j$ is the first matrix, $V_j$ is the second matrix, and alternatively, if $V_j$ is the first matrix, $U_j$ may be the second matrix). Further, the processor 120 may apply a low rank approximation rather than simple matrix decomposition of the square matrix $M_j$ and thus, the approximated first and second matrices (e.g., $U_j'$ and $V_j'$) may be obtained.

As such, the result of the product of $U_j'$ and $V_j'$ is different from the original matrix $M_j$, because the approximation of the data occurs in the process of applying the low rank approximation through the matrix decomposition with respect to the original matrix $M_j$, in which the compression of the data may occur. Here, obtaining the approximated first and second matrices may mean that the result of the product does not exactly match the original square matrix.

For example, when the square matrix $M_j$ is matrix-decomposed to the rank (or coefficient) k (wherein k is smaller than m), one matrix $U_j'$ in a m×k size and another matrix $V_j'$ in a k×m size may be obtained, where data approximation (or compression) occurs in the process of obtaining matrix $U_j'$ and $V_j'$, and as a result, $U_j' *V_j'$ and $M_j$ become different.

In addition, the matrix decomposition and low rank approximation may be performed simultaneously. That is, the above description merely describes the matrix decomposition and the low rank approximation separately, but the calculation is not limited thereto. For example, the processor 120 may perform the matrix decomposition and the low rank approximation simultaneously or sequentially without any limit to the order of operation.

The processor 120 may select any one of the plurality of square matrices by a predetermined criterion and apply a low rank approximation through the matrix decomposition to any one of the selected square matrix. Here, the predetermined criteria may be determined based on experimental data.

For example, if the selected one of the square matrices is $M_j(1 \leftarrow j \leftarrow i)$, the processor 120 may apply a low rank approximation (e.g., rank=k, k<m) through the matrix decomposition for $M_j$ to calculate $U_j'$ and $V_j'$ for $M_j$.

When the singular value decomposition is used as a method for matrix decomposition, the processor 120 may apply the singular value decomposition for $M_j$ to obtain $U_j$ and $V_j$, and apply a low rank approximation to $U_j$ and $V_j$ to obtain $U_j'$ and $V_j'$ for $M_j$. In this example, $U_j'$ and $V_j'$ are each approximated left-singular value vector matrix and approximated right-singular value vector matrix for $M_j$. In actual algorithm, the singular value decomposition and low rank approximation may be performed at the same time.

Any one of $U_j'$ and $V_j'$ may be an approximated first matrix for $M_j$. Thus, the other one of $U_j'$ and $V_j'$ may be the approximated second matrix for $M_j$. $U_j'$ has the size of m×k, and $V_j'$ has the size of k×m.

The processor 120 may obtain the approximated second matrix for the other square matrix among a plurality of square matrices based on the approximated first matrix for the one square matrix in operation S430.

For example, if the approximated first matrix for any one of the square matrices $M_j$ is $V_j'$, the processor 120 may calculate $U_x'$ (that is, $U_1'$ to $U_i'$) for the remaining square matrices $M_1 \ldots i$ based on $V_j'$. At this time, U' of each of $M_1 \ldots i$ will have the size of m×k. If the singular value decomposition is used as a method of matrix decomposition, U' may include Y' as described above.

Specifically, the processor 120 may calculate $U_x'$ through an algorithm to minimize the difference between $M_x$ and $(U_x' * V_j')$.

If the singular value decomposition is used as a method for matrix decomposition, the processor 120 may calculate $U_x'$ through the algorithm, such as Equation 1 below.

$$M_X * (((V^C)^T)^{-1})' = U'_X \qquad \text{[Equation 1]}$$

The reason why $U_x'$ is not obtained through a simple equation such as $M_x * (V_j')^{-1} = U_x'$ is that the inverse matrix may not be accurately obtained since the $V_j'$ is not a square matrix. Therefore, according to an embodiment, apply a low rank approximation to the inverse matrix of a transposed matrix $(V_j)^T$ as Equation 1 by using a characteristic that $V_j$ is a unitary matrix, and then use the result to obtain $U_x'$.

As such, according to one embodiment, through $V_j'$ for a selected one of a plurality of square matrices $M_j$, $U_x'$ of the remaining square matrices may be obtained. Thus, $V_j'$ may be referred to as a common matrix in some examples. In particular, when singular value decomposition is used, $V_j'$ may be referred to as a common singular value vector matrix.

As described above, $V_j'$ is the approximated first matrix for any one of the square matrices $M_j$, that is, a common matrix (or a common singular value vector matrix), and that the approximated second matrix $U_x'$ of the remaining square matrices is obtained based thereon, but the embodiment is not limited thereto.

According to an alternative embodiment, $U_j'$ may be the approximated first matrix for $M_j$. In this example, the processor 120 may obtain the approximated second matrix of the remaining square matrices, that is, $V_x'$ ($V_1'$ to $V_i'$), based on $U_j'$. The detailed description thereof will be obvious to a person skilled in the art from the above description in which the approximated first matrix is $V_j'$.

The processor 120 may store the approximated first matrix $V_j'$ for any one of the square matrices and the approximated second matrix $U_1'$ to $U_i'$ for the plurality of square matrices in the memory 110 in a compressed form of the deep learning model.

Herein below, a compressed format of the deep learning model will be described with reference to FIG. 5. FIG. 5 is a view illustrating a method of decomposing and approximating a plurality of square matrices by a rank k.

Figure 5:
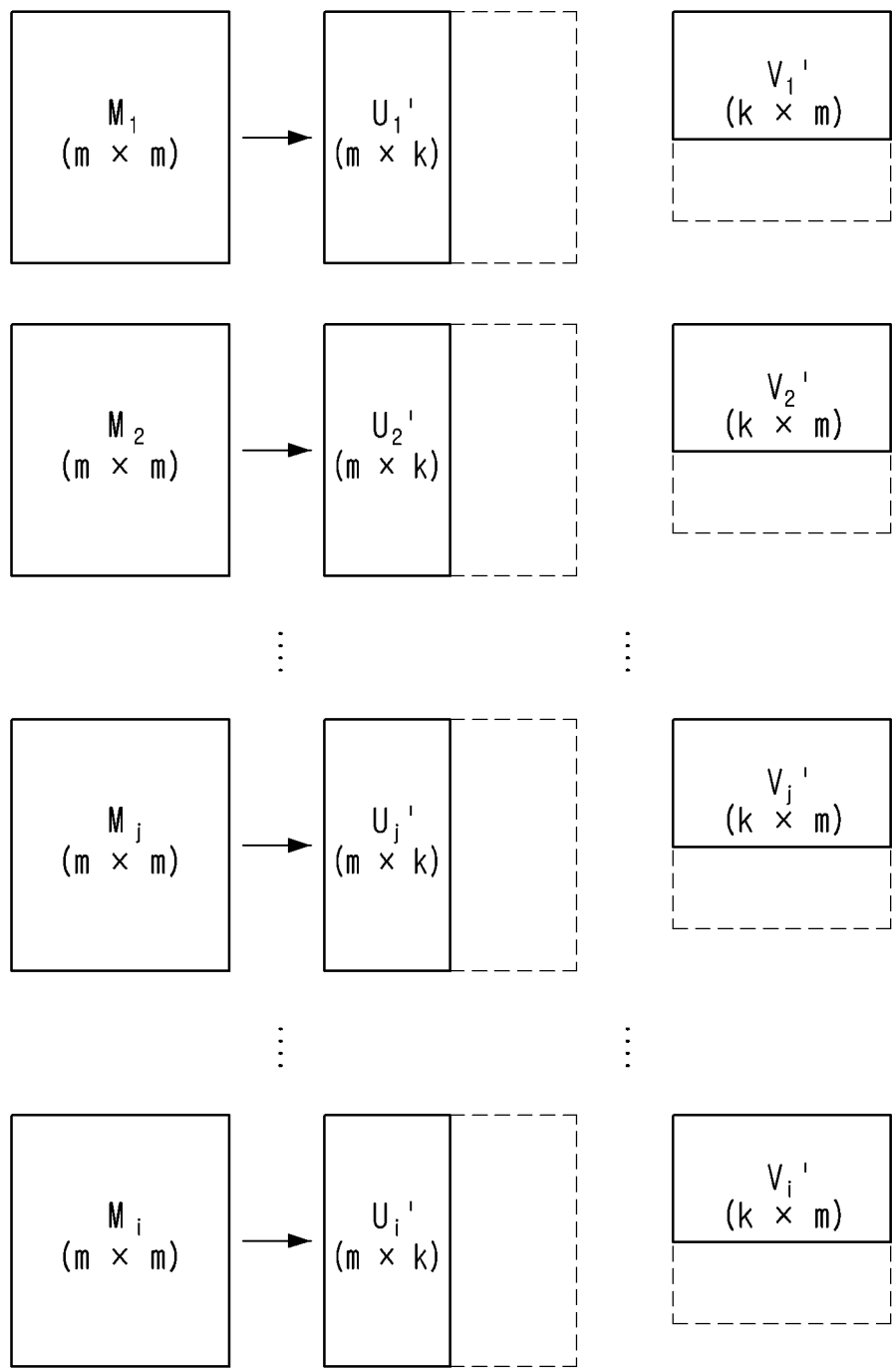
FIG. 5 is a view illustrating a method for decomposing and approximating a plurality of square matrices by a low rank according to an embodiment.

As illustrated in FIG. 5, the square matrix $M_1$ to $M_i$ in the size of m×m may be decomposed by rank k to be approximated from $U_1' * V_1'$ to $U_i' * V_i'$, respectively. Here, $M_1$ to $M_i$ may be a plurality of square matrices obtained based on parameter values of the deep learning model.

When applying the low rank approximation through the singular value decomposition from $M_1$ to $M_i$, the matrices $M_1$ to $M_i$ may be approximated from $U_1' * V_1'$ to $U_i' * V_i'$, respectively. In this process, the deep learning model may be compressed as described above. That is, in the related-art, the result in which the deep learning model is compressed becomes i number of U' and i number of V'.

As described above, according to various embodiments, the processor 120 obtains the approximated second matrix of the remaining square matrices via the approximated first matrix for one square matrix and thus, the processor 120 may obtain $U_1 \ldots U_i$ and only one $V_j'$ for the plurality of square matrices $M_1$ to $M_i$. That is, the result of the deep learning model being compressed according to various examples is i number of U' and one V', which means that the various embodiments of the disclosure have a compression rate that is twice as higher than that of the related-art.

In operation s440, the processor 120 may re-learn information based on the compressed deep learning model obtained as described above. When the deep learning model is compressed, accuracy may somewhat fall compared to the deep learning model prior to compression. Accordingly, it is necessary to re-learn information based on the compressed deep learning model to revamp the decreased performance.

In this case, for example, a re-learning methodology based on DeepTwist may be used. The DeepTwist-based re-learning methodology is a way of training the parameters of the model network into a form that may be easily compressed by repeating compression-reconstruction-re-learning.

The compression and reconstruction of a model has an effect of adding a noise to an existing parameter and inducing a reasonable learning result in consideration of the noise, and the deep learning model is induced to have high accuracy.

For example, in operation S420 of FIG. 4, if any one square matrix for obtaining the approximated first matrix is selected, square matrices which are different every time may be selected and compressed.

That is, if the square matrix M1 is selected in the initial compression of the initial deep learning model to obtain the approximated first matrix V1' and compression is performed based thereon, and when the compressed deep learning model is reconstructed and re-trained, and then re-compressed, the deep learning model may be compressed by selecting different square matrix every time by selecting the square matrix M2 to obtain the approximated first matrix V2', and performing compression based thereon.

When compressing and reconstructing has an effect of adding a noise to a model parameter, the change in a direction of the added noise may be performed to further normalize the model and obtain better accuracy. This is advantageous in that higher compression rates may be obtained. Finally, one square matrix $M_j$ will be selected to determine the compressed form of the deep learning model.

The re-learning method that may be applied to various embodiments is not limited to the re-learning method based on DeepTwist and any other re-learning method may be used.

The electronic apparatus 100 may further include a communicator for communicating with an external network or other electronic apparatus. In addition, when the electronic apparatus 100 is implemented as various terminal devices according to an embodiment, the electronic apparatus 100 may further include various configurations (e.g., various sensors, various input interfaces for receiving user commands, various output interfaces such as speakers or displays, etc.) for performing the functions of the corresponding terminal device.

Figure 6:
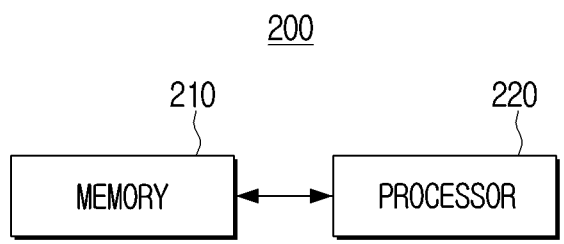
FIG. 6 is a block diagram illustrating an electronic apparatus according to another embodiment.

FIG. 6 is a block diagram illustrating an electronic apparatus according to another embodiment. Referring to FIG. 6, the electronic apparatus 200 may include a memory 210 and a processor 220.

The memory 210 may store various data. The memory 210 may store compressed deep learning model.

Here, the compressed deep learning model may include the compressed deep learning model described above with reference to FIGS. 2 to 5. Specifically, the compressed deep learning model may include an approximated first matrix for any one of a plurality of square matrices based on parameter values of the deep learning model and a second approximated matrix for the plurality of square matrices, as described above.

The memory 210 may include any one or more volatile memory or non-volatile memory. The volatile memory may include dynamic random access memory (DRAM), static RAM (SRAN), synchronous DRAM (SDRAM), phase-change RAM (PRAM), magnetic RAM (MRAM), resistive RAM (RRAM), ferroelectric RAM (FeRAM), or the like. The non-volatile memory may include read only memory (ROM), programmable ROM (PROM), electrically programmable ROM (EPROM), electrically erasable programmable ROM (EEPROM), flash memory, or the like. The memory 210 may include non-volatile medium such as hard disk drive (HDD), solid state disk (SDD), embedded multimedia card (eMMC), universal flash storage (UFS), or the like.

The processor 220 may control the overall operation of the electronic apparatus 200. In particular, processor 220 may execute the compressed deep learning model stored in the memory 210. Specifically, the processor 220 may load the compressed deep learning model stored in the memory 210 and obtain an output value based on the loaded compressed deep learning model.

Hereinafter, various embodiments of the processor 220 executing the compressed deep learning model will be described with reference to FIGS. 7 and 8.

Figure 7:
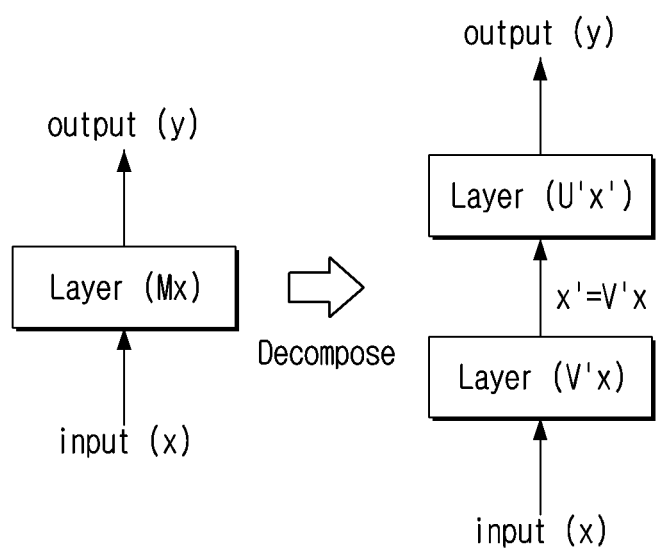
FIG. 7 is a view illustrating a method of generating an output value using an approximated matrix by an electronic apparatus according to an embodiment.

FIG. 7 is a view illustrating a method of generating an output value using an approximated matrix by an electronic apparatus according to an embodiment. When a layer of the deep learning model is constructed and the parameter matrix M of the corresponding layer exists as shown in the left figure of FIG. 7, the matrix M may be approximated to U' and V' and decomposed. It may be advantageous to perform the low rank approximation through the existing singular value decomposition so that the output value for the input x may be calculated as in the right figure of FIG. 7.

The deep learning model compression method according to various embodiments described above decomposes parameters of the deep learning model into a product of the approximated matrix U' and V' of each of the plurality of square matrices after reshaping the parameters of the deep learning model to the plurality of square matrices, where V' is the same.

Therefore, when the compressed deep learning model is executed, it is efficient to read the same matrix V' only once and re-use in close proximity to the calculator of the processor 220.

Figure 8:
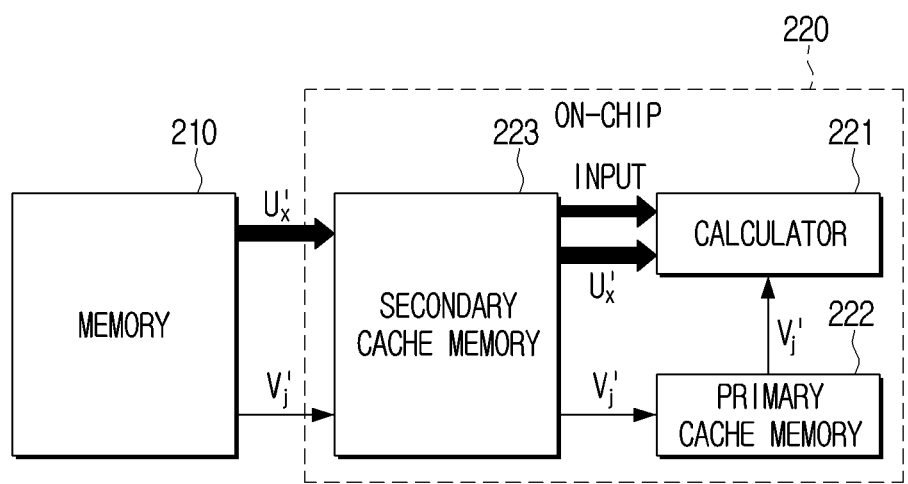
FIG. 8 is a block diagram illustrating an electronic apparatus according to another embodiment.

FIG. 8 is a block diagram illustrating an electronic apparatus according to another embodiment. Referring to FIG. 8, the processor 220 may be implemented as one chip and may include a calculator 221, a primary cache memory 222, and a secondary cache memory 223.

The calculator 221 may be configured to calculate data, and may include at least one of a central processing unit (CPU), application processor (AP), or graphic processing unit (GP), and may be referred to as a processing unit (PE).

The primary cache memory 222 and the secondary cache memory 223 may be collectively referred to as "on-chip memory" as memories that are present within the processor 220 chip. The primary cache memory 222 and the secondary cache memory 223 are generally faster in access speed and smaller in capacity than the memory 210 that exists outside the processor 220 chip. The terms primary and secondary associated with the memory may indicate a level of the cache memory. That is, the capacity of the primary cache memory 222 is smaller than the capacity of the secondary cache memory 223, but the access speed of the calculator 221 to the primary cache memory 222 may be at its highest performance. For example, the memory 210 may be implemented as a DRAM, and the primary and secondary cache memories 222 and 223 may be implemented as SRAMs, but this is merely an example, and the embodiments of the disclosure are not limited thereto.

For example, FIG. 8 illustrates deep learning inference hardware comprised of the memory 210, the on-chip memories 222 and 223, and the calculator 221. Specifically, FIG. 8 shows a structure in which the deep learning model parameter and the input values are calculated in the calculator 221, and the data required for the deep learning operation, that is, the deep learning model, is loaded onto the on-chip memories 222 and 223 from the memory 210, and supplied to the calculator 221 from the on-chip memories 222 and 223.

As is well known, the process of transferring data from the memory 210 outside the chip of the processor 220 to the inside of the chip consumes a large amount of power and causes a significant delay time. The reduction of consumption of power and the delay time is one of the advantages of model compression, and various embodiments of the disclosure may significantly enhance the effect of model compression.

In FIG. 8, the thickness of lines indicates data transmission amount in a conceptual manner. While the not-common matrix $U_x'$ requires a relatively large data transmission amount and large number of transmission, the common matrix $V_j'$ has a small data transmission amount and may be loaded onto the processor 220 chip with only a small number of transmissions.

One of the differences between the electronic apparatus 200 according to an embodiment and the related art is that the primary cache memory 222 is positioned in close proximity of the calculator 221 in which actual calculation is performed, and the common matrix $V_j'$ is loaded onto the primary cache memory 222 for re-use. Since the calculator 221 reads the common matrix $V_j'$ at a relatively closer position, the calculator 221 may perform algorithms related to the common matrix $V_j'$ at a faster speed and at a lower cost.

According to an embodiment, the processor 220 may load the approximated first matrix stored in the memory 210 onto the primary cache memory 222, load at least one of the plurality of approximated second matrices stored in the memory 210 onto the secondary cache memory 223, accordingly the calculator 221 obtain an output value based on the approximated first and second matrices loaded in the primary cache memory 222 and the secondary cache memory 223, respectively.

Accordingly, the electronic apparatus 200 may read the data stored in the memory 210 with lower power and latency and thus, rapid algorithm is possible. That is, the common matrix $V_j'$ has been loaded in proximity and loading time may be saved.

According to another embodiment, the $U_x'$ may be loaded from the memory 210 while algorithm related to the common matrix $V_j'$ is performed.

That is, according to an embodiment, the at least one approximated second matrix among the plurality of approximated second matrices may be loaded into the secondary cache memory 222 while performing the first algorithm based on the input value (e.g., x) and the approximated first matrix loaded in the primary cache memory 222, and the calculator 221 may perform a second algorithm based on the first algorithm result and the approximated second matrix loaded in the secondary cache memory 223.

For example, when the input value is x, the $U_x>$ stored in the memory 210 may loaded into the secondary cache memory 223 while performing the $V_j'*x$ operation based on the $V_j'$ loaded in the primary cache memory 222. Accordingly, the output value y for the input value x is determined by performing $U_x'*x'$ algorithm based on the result of $V_j'*x$ algorithm (for example, x') and $U_x'$ loaded in the secondary cache memory 223.

In this example, the loading time from the memory 210 and calculation time may be overlapped so as to reduce the overall processing time by the algorithm, thus increasing the speed of the algorithm.

It has been described that the common matrix of the compressed deep learning model is $V_j'$, but as described above, $U_j'$ may be the common matrix according to an embodiment. In this example, $U_j'$ will be loaded into the primary cache memory 222.

In the deep learning hardware aspects, additional model merging overhead may occur if the matrix is divided into too many pieces. That is, data needs to be prepared according to the calculation method, and the various embodiments are not restricted in accordance with the data format. Therefore, according to various embodiments, the deep learning model is compressed and re-trained to arrange data according to a specific hardware operation method.

Although not illustrated in drawings, the electronic apparatus 200 may further include a communicator (not shown) for communicating with an external network or other electronic apparatus. In addition, when the electronic apparatus 200 is implemented as various terminal devices according to an embodiment, the electronic apparatus 200 may further include various configurations (e.g., various sensors, various input interfaces for receiving various commands, various output interfaces such as speakers or displays, etc.) for performing the functions of the terminal device.

Figure 9:
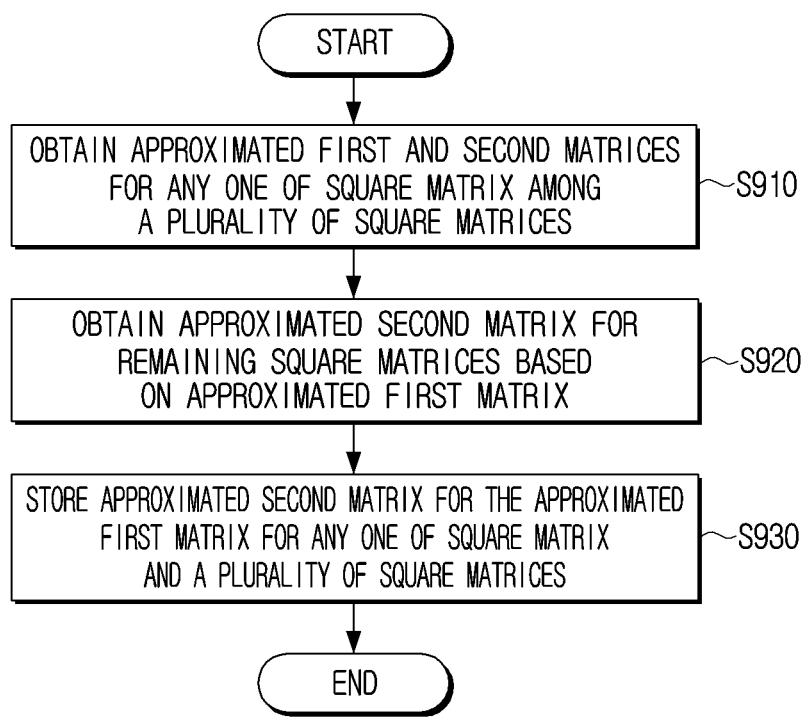
FIG. 9 is a flowchart of a method for controlling of an electronic apparatus according to an embodiment.

FIG. 9 shows a flowchart of a method for controlling of an electronic apparatus according to an embodiment. Referring to FIG. 9, the electronic apparatus obtains the approximated first and second matrices for any one of square matrices by applying the low rank approximation through matrix decomposition for any one square matrix among a plurality of square matrices based on the parameter values of the deep learning model in operation S910.

For example, the electronic apparatus 100 may apply a low rank approximation through the singular value decomposition (SVD) to any one of the square matrices to obtain approximated first and second matrices for the one square matrix.

Specifically, the electronic apparatus 100 may apply the singular value decomposition to any one of the square matrices to obtain first and second matrices, and apply the low rank approximation to the first and second matrices to obtain approximated first and second matrices for the any one of the square matrices.

The approximated first matrix may be an approximated right-singular value vector matrix for one square matrix, and the approximated second matrix for each of the plurality of square matrices may be an approximated left-singular value vector matrix for each of the plurality of square matrices.

The electronic apparatus 100 may obtain the approximated second matrix for the remaining square matrices among the plurality of square matrices based on the approximated first matrix for any one square matrix in operation S920.

Specifically, the electronic apparatus 100 may obtain the approximated second matrix of each of the remaining square matrices by multiplying the inverse matrix of the transposed first matrix by each of the remaining square matrices.

The electronic apparatus 100 may obtain the approximated second matrix of the second square matrix through an algorithm that minimizes the difference between the second square matrix and a product of the approximated second matrix of the second square matrix and the approximated first matrix of the first square matrix. The first square matrix may be any one of the square matrices, and the second square matrix may be a square matrix of any one of the remaining square matrices.

Accordingly, the electronic apparatus 100 may store the approximated first matrix for any one of the square matrices and the approximated second matrix for the plurality of square matrices in the compressed form of the deep learning model in operation S930. The electronic apparatus 100 may transmit the compressed deep learning model stored according to the request of the other electronic apparatus 200 to the electronic apparatus 200 through a network 1 or directly to the electronic apparatus 200.

Figure 10:
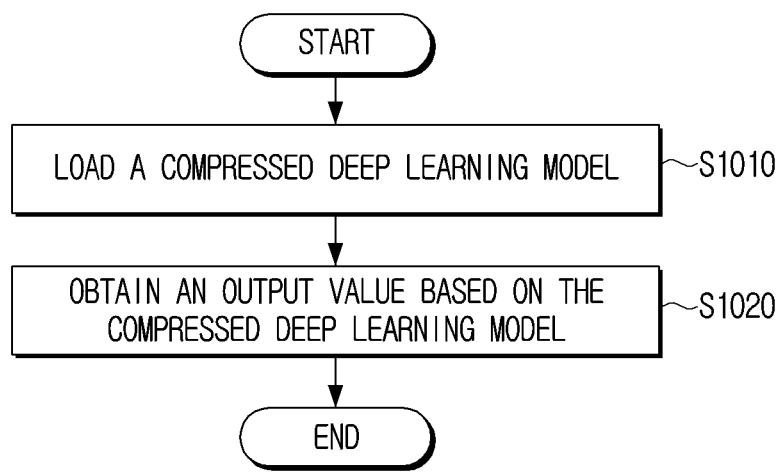
FIG. 10 is a flowchart of an electronic apparatus according to another embodiment.

FIG. 10 is a flowchart illustrating a controlling method of the electronic apparatus according to another embodiment. According to FIG. 10, the electronic apparatus 200 may load the compressed deep learning model stored in the memory 210 in operation S1010.

The compressed deep learning model may include an approximated first matrix and a plurality of approximated second matrices, and the approximated first matrix is a matrix of any one of the two matrices obtained by applying a low rank approximation through matrix decomposition with respect to any one of a plurality of square matrices based on parameter values of the deep learning model. The plurality of approximated second matrices may include a matrix obtained based on the other one of the obtained two matrices, the approximated first matrix, and the remaining one of the plurality of square matrices.

The approximated first matrix may be a right-singular vector matrix obtained by applying a low rank approximation through singular value decomposition with respect to one square matrix, and the plurality of approximated second matrices may be approximated left-singular vector matrices for each of the plurality of square matrices.

Specifically, the electronic apparatus 200 may load the approximated first matrix stored in the memory 210 in the primary cache memory 222, and load at least one of the plurality of approximated second matrices stored in the memory 210 in the secondary cache memory 223.

The electronic apparatus 200 may load the at least one approximated second matrix among the plurality of approximated second matrices to the secondary cache memory 223 while the first algorithm is performed based on the input value and the approximated first matrix loaded to the primary cache memory 222.

Accordingly, the electronic apparatus 200 may obtain an output value based on the compressed deep learning model in operation S1020. Specifically, the electronic apparatus 200 may obtain an output value based on the approximated matrix loaded into the primary cache memory 222 and the secondary cache memory 223.

The electronic apparatus 200 may perform the second algorithm based on the approximated second matrix loaded to the secondary cache memory 223 and the result of the first algorithm.

As described above, according to various embodiments, a compression ratio of a deep learning model may be enhanced without performance degradation. In addition, power consumption may be reduced when performing a deep learning model by utilizing a compressed deep learning model, and a delay of a response time may also be reduced.

Here, various embodiments of the disclosure may be implemented in software, including instructions stored on machine-readable storage media readable by a machine (e.g., a computer). An electronic apparatus, including the electronic apparatus 100 and 200, may call instructions from the storage medium and execute the called instruction according to the embodiments of the disclosure. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the case in which data is semi-permanently stored in a storage medium from the case in which data is temporarily stored in a storage medium.

According to an embodiment, the method according to the above-described embodiments may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™ and App Store™) or distributed online (e.g., downloaded or uploaded) directly between to users (e.g., smartphones). In the case of online distribution, at least a portion of the computer program product may be at least temporarily stored or temporarily generated in a server of the manufacturer, a server of the application store, or a machine-readable storage medium such as memory of a relay server.

According to embodiments of the disclosure, the respective elements (e.g., module or program) of the elements mentioned above may include a single entity or a plurality of entities. Furthermore, at least one element or operation from among the corresponding elements mentioned above may be omitted, or at least one other element or operation may be added. Alternatively or additionally, a plurality of components (e.g., module or program) may be combined to form a single entity. As such, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

Although the disclosure has been described by way of examples, it will be understood by those skilled in the art that various changes in form and details may be made therein without departing from the essential characteristics thereof. In addition, the embodiments according to the disclosure are not intended to limit the technical spirit of the disclosure, but to describe the technical aspect and the scope of the technical aspect of the disclosure is not limited by the embodiments herein. Accordingly, the scope of protection of the disclosure should be construed by the following claims, and all technical ideas that fall within the scope of the disclosure are to be construed as falling within the scope of the disclosure.

What is claimed is:

1. An electronic apparatus comprising:
an off-chip memory; and
a processor coupled to the off-chip memory, the processor comprising a calculator, an on-chip primary cache memory and an on-chip secondary cache memory, the processor configured to:
obtain a first matrix and a second matrix by applying a singular value decomposition (SVD) to a first square matrix among a plurality of square matrices based on parameter values of a deep learning model,
obtain a first approximated matrix and a second approximated matrix for the first square matrix by applying a low rank approximation to the first matrix and the second matrix,
obtain second approximated matrices for each of a plurality of remaining square matrices other than the first square matrix among the plurality of square matrices, based on the first approximated matrix for the first square matrix, and
store, as a compressed deep learning model, the first approximated matrix for the first square matrix and the second approximated matrices for each of the plurality of square matrices in the off-chip memory,
wherein the calculator is configured to load from the off-chip memory into the on-chip primary cache memory the first approximated matrix, load from the off-chip memory into the on-chip secondary cache memory at least one second approximated matrix from among the second approximated matrices loaded from the off-chip memory into the on-chip secondary cache memory, and obtain an output value utilizing the compressed learning model based on the loaded first approximated matrix and the loaded at least one second approximated matrix,
wherein the calculator further is configured to load the at least one second approximated matrix from the off-chip memory into the on-chip secondary cache memory during execution of a first algorithm based on an input value and the loaded first approximated matrix, and wherein the calculator is further configured to perform a second algorithm based on a result of the first algorithm and the loaded at least one second approximated matrix.

2. The electronic apparatus of claim 1, wherein the first approximated matrix for the first square matrix is a right-singular value vector matrix approximated for the first square matrix, and wherein the second approximated matrices for each of the plurality of square matrices are left-singular value vector matrices approximated for each of the plurality of square matrices.

3. The electronic apparatus of claim 1, wherein the processor is further configured to obtain the second approximated matrices for each of the plurality of remaining square matrices by multiplying each of the plurality of remaining square matrices by an inverse matrix of a transposed first approximated matrix.

4. The electronic apparatus of claim 1, wherein the processor is further configured to obtain a second approximated matrix for a second square matrix through an algorithm to minimize a difference between the second square matrix and a product of the second approximated matrix for the second square matrix and the first approximated matrix for the first square matrix, and wherein the second square matrix is any one of the plurality of remaining square matrices.

5. An electronic apparatus comprising:

an off-chip memory storing a first approximated matrix and second approximated matrices forming a compressed deep learning model; and a processor coupled to the off-chip memory, the processor comprising a calculator, an on-chip primary cache memory, and an on-chip secondary cache memory, the processor configured to:

load the compressed deep learning model stored in the off-chip memory such that the first approximated matrix is loaded from the off-chip memory into the on-chip primary cache memory and at least one second approximated matrix from among the second approximated matrices is loaded from the off-chip memory into the on-chip secondary cache memory, wherein the calculator is configured to obtain an output value utilizing the compressed deep learning model based on the loaded first approximated matrix and the loaded at least on second approximated matrix, wherein the first approximated matrix is one of two matrices obtained by, obtaining a first matrix by applying a singular value decomposition (SVD) to a first square matrix among a plurality of square matrices based on parameter values of a deep learning model and applying a low rank approximation to the obtained first matrix, wherein the second approximated matrices comprise another approximated matrix other than the first approximated matrix among the two matrices and approximated matrices obtained based on the first approximated matrix and a plurality of remaining square matrices other than the first square matrix among the plurality of square matrices, wherein, the calculator is configured to load the at least one second approximated matrix from the off-chip memory into the on-chip secondary cache memory during execution of a first algorithm based on an input value and the loaded first approximated matrix, and wherein the calculator is further configured to perform a second algorithm based on a result of the first algorithm and the loaded at least one second approximated matrix loaded into the on-chip secondary cache memory.

6. The electronic apparatus of claim 5, wherein the first approximated matrix is a right-singular value vector matrix obtained by applying the low rank approximation through SVD to the first square matrix, and wherein the second approximated matrices are left-singular value vector matrices for each of the plurality of square matrices.

7. A method for controlling an electronic apparatus, the method comprising:

obtaining, by a processor of the electronic apparatus, a first matrix and a second matrix by applying a singular value decomposition (SVD) to a first square matrix among a plurality of square matrices based on parameter values of a deep learning model;

obtaining, by the processor, a first approximated matrix and a second approximated matrix for the first square matrix by applying a low rank approximation to the first matrix and the second matrix;

obtaining, by the processor, second approximated matrices for each of a plurality of remaining square matrices other than the first square matrix among the plurality of square matrices based on the first approximated matrix for the first square matrix; and storing, as a compressed deep learning model, the first approximated matrix for the first square matrix and the second approximated matrices for each of the plurality of square matrices in a memory, wherein the processor is coupled to off-chip memory, wherein the processor comprises a calculator, an on-chip primary cache memory, and an on-chip secondary cache memory, wherein the calculator is configured to load from the off-chip memory into the on-chip primary cache memory the first approximated matrix, load from the off-chip memory into the on-chip secondary cache memory at least one second approximated matrix from among the second approximated matrices loaded from the off-chip memory into the on-chip secondary cache memory of the processor, and obtain an output value utilizing the compressed learning model based on the loaded first approximated matrix and the loaded at least one second approximated matrix, wherein; the calculator is further configured to load the at least one second approximated matrix from the off-chip memory into the on-chip secondary cache memory of the processor during execution of a first algorithm based on an input value and the loaded first approximated matrix, and wherein the calculator is further configured to perform a second algorithm based on a result of the first algorithm and the loaded at least one second approximated matrix.

8. The method of claim 7, wherein the first approximated matrix for the first square matrix is a right-singular value vector matrix approximated for the first square matrix, and wherein the second approximated matrices for each of the plurality of square matrices are left-singular value vector matrices approximated for each of the plurality of square matrices.

9. The method of claim 7, wherein the obtaining the second approximated matrices for each of the plurality of remaining square matrices comprises obtaining the second approximated matrices for each of the plurality of remaining square matrices by multiplying each of the plurality of remaining square matrices by an inverse matrix of a transposed first approximated matrix.

10. The method of claim 7, wherein the obtaining the second approximated matrices for each of the plurality of remaining square matrices comprises:
   obtaining a second approximated matrix for a second square matrix through an algorithm to minimize a difference between the second square matrix and a product of the second approximated matrix for the second square matrix and the first approximated matrix for the first square matrix, and
   wherein the second square matrix is any one of the plurality of remaining square matrices.

11. A method for controlling an electronic apparatus, the method comprising:
   loading, by a processor of the electronic apparatus, a compressed deep learning model stored in an off-chip memory coupled to the processor such that a first approximated matrix of the compressed deep learning model is loaded from the off-chip memory into an on-chip primary cache memory of the processor and at least one second approximated matrix from among second approximated matrices of the compressed deep learning model is loaded from the off-chip memory into an on-chip secondary cache memory of the processor; and
   obtaining, by the processor, an output value based on the compressed deep learning model including the first approximated matrix and the at least on second approximated matrix,
   wherein the first approximated matrix is obtained by,
   obtaining a first matrix by applying a singular value decomposition (SVD) to a first square matrix among a plurality of square matrices based on parameter values of a deep learning model and applying a low rank approximation to the obtained first matrix,
   wherein the second approximated matrices comprise another approximated matrix other than the first approximated matrix among the two matrices and approximated matrices obtained based on the first approximated matrix and a plurality of remaining square matrices other than the first square matrix among the plurality of square matrices,
   wherein the processor further comprises a calculator configured to obtain the output value based on the approximated matrices loaded into the on-chip primary cache memory and the on-chip secondary cache memory,
   wherein the loading further comprises:
   loading the at least one second approximated matrix from the off-chip memory into the on-chip secondary cache memory during execution of a first algorithm based on an input value and the loaded first approximated matrix, and
   wherein the obtaining the output value further comprises performing a second algorithm based on a result of the first algorithm and the loaded at least one second approximated matrix.

12. The method of claim 11, wherein the first approximated matrix is a right-singular value vector matrix obtained by applying the low rank approximation through SVD to the first square matrix, and
   wherein the second approximated matrices are left-singular value vector matrices for each of the plurality of square matrices.

13. The electronic apparatus according to claim 1, wherein the processor is configured to re-train the compressed deep learning model.

14. The electronic apparatus according to claim 1, wherein the off-chip memory is a dynamic random access memory (DRAM), the on-chip primary cache memory is a static random access memory (SRAM), and the on-chip secondary cache memory is a SRAM.

* * * * *